United States Patent [19]

Charransol et al.

[11] 4,224,475
[45] Sep. 23, 1980

[54] TIME DIVISION SWITCHING NETWORK

[75] Inventors: Pierre Charransol; Claude Athenes; Jacques Sallé, all of Paris, France

[73] Assignee: Thomson-CSF, Paris, France

[21] Appl. No.: 4,237

[22] Filed: Jan. 17, 1979

[30] Foreign Application Priority Data

Jan. 20, 1978 [FR] France .................. 78 01634

[51] Int. Cl.² .......................................... H04Q 11/04
[52] U.S. Cl. ...................................... 370/59; 370/13; 370/68
[58] Field of Search ......... 179/15 AT, 15 AQ, 15 BF

[56] References Cited

U.S. PATENT DOCUMENTS

| | | | |
|---|---|---|---|
| 3,864,525 | 2/1975 | Edstrom et al. ................ | 179/15 AT |
| 3,941,947 | 3/1976 | Jacob et al. ..................... | 179/15 AT |
| 4,021,619 | 5/1977 | Potter et al. .................... | 179/15 AT |
| 4,101,737 | 7/1978 | Philip ............................. | 179/15 AT |

Primary Examiner—Douglas W. Olms
Attorney, Agent, or Firm—Edwin E. Greigg

[57] ABSTRACT

A switching system for telephone exchanges employing pulse code modulation (PCM). The time division switching network uses standard circuits of a single type, i.e., symmetrical time division matrices (MTS) and, in a particular embodiment, one PCM telephone junction is multipled onto two inputs of two MTSs and the latter are rejoined by two bi-directional junctions so that the construction of telephone exchange according to the invention permits simple and easy extensions of the capacity of the switching system.

10 Claims, 13 Drawing Figures

Pl. II-6

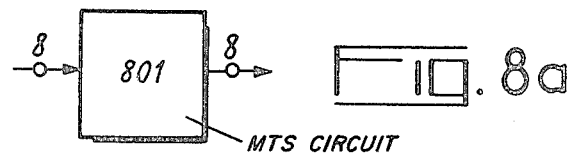
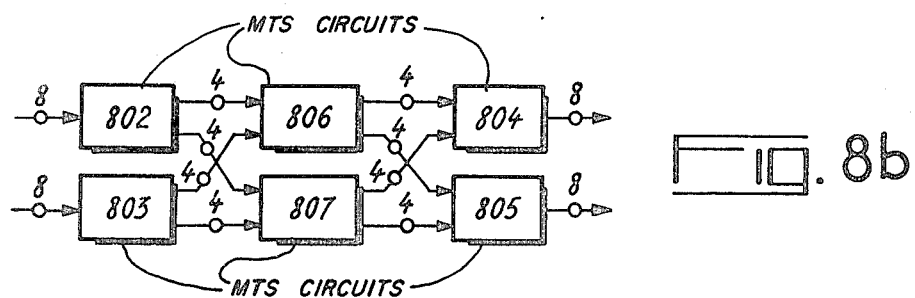
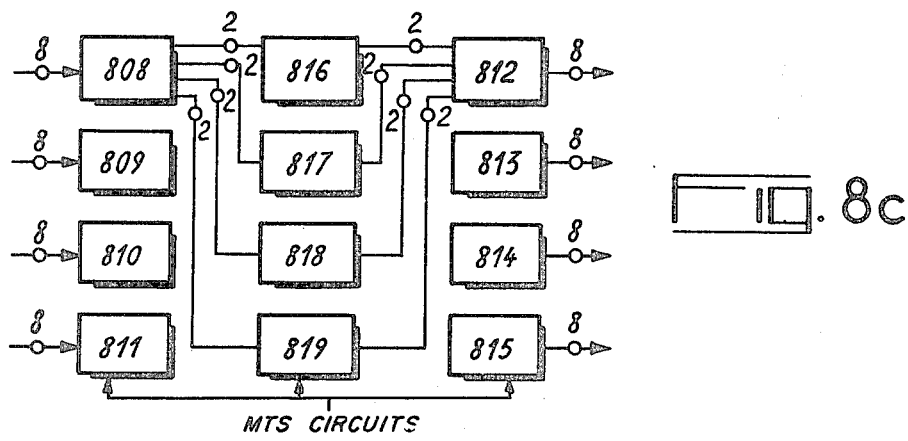
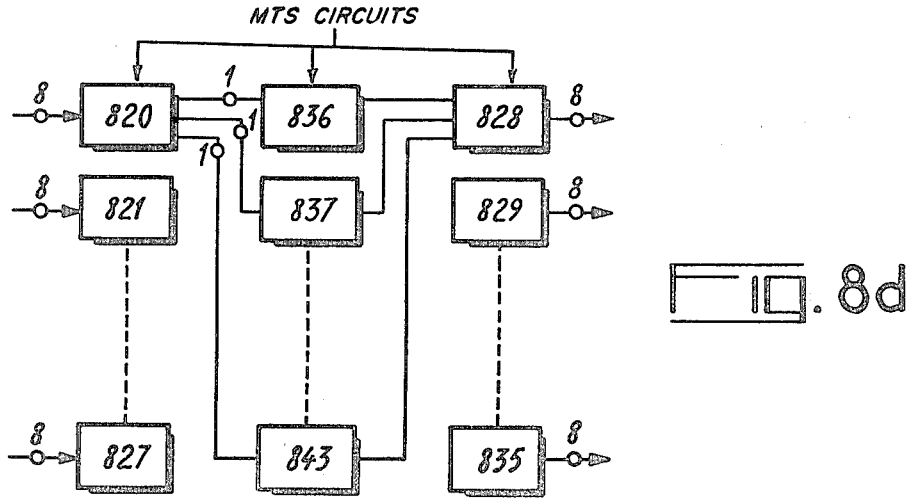

TIME DIVISION SWITCHING NETWORK

BACKGROUND OF THE INVENTION

The present invention relates to a network employing both time division and space switching for use in telephone exchanges that employ the technique of pulse code modulation (PCM) and permit the connection between a calling subscriber and a called subscriber.

It will be recalled that the pulse code modulation technique consists of sampling the speech signals at the rate of 8 kHz and to code these samples in 8-bit words. Subsequently the codes samples are reassembled in frames of 32 time slots corresponding to PCM junctions of 32 lines. The aforementioned digital values are given only by way of example, but they are the numbers most often used to national and international requirements. The same remarks apply to any subsequently used digital data. It is known to construct switching networks for telephone exchanges by more or less complex assemblies of circuits which are called time division switches and space switches.

It is known, for example, to construct a switching network of the type TST in which a space stage S is placed between two time division switching stages T so that the overall assembly permits the desired connections.

If the network is to be free of any interval blocking the number of output links must be approximatively equal to twice the number of access links and this connection must prevail in the space stages as well as in the time division switching stages (where the links are represented by time slots). At constant speed, this requirement leads to doubling the equipment of the time division switching stages and hence to quadrupling the equipment in the space stages. This is a great drawback. It is the object of the invention to provide a novel structure of space and time division switching networks which permits obtaining a blocking rate which is negligible in terms of modern-day requirements and with only a very minor increase of the equipment used.

The switching network according to the invention includes a certain number of elementary switching circuits, each switching circuit being able to perform at the same time a space and a time division switching and without the use of any purely time division switch of purely space switch. The elementary switching circuit used in order to build this switching network is the symmetrical time division matrix (MTS), described in the U.S. Pat. appln. Ser. No. 768,632 now issued as U.S. Pat. No. 4,093,827. The MTS circuit makes it possible to switch each one of the time slots of the eight PCM input junctions MIC1-MIC8 on any one of the time slots of the eight output junctions S1-S8, thereby providing 256 routes.

Other particularities and advantages of the invention will become clear from the following description of a number of particular embodiments of a switching network which uses, as its only and exclusive elementary switching circuit, the aforementioned MTS matrices. It will be understood that this description is given by way of non-limiting example and is not intended to restrict the scope of the invention in any way. The description is made with reference to the figures of the drawings.

BRIEF DESCRIPTION OF THE DRAWINGS

FIG. 8a is a diagrammatic illustration of one embodiment of the connection plan according to FIG. 7;

FIG. 8b is a diagrammatic illustration of a second embodiment of the connection plan according to FIG. 7;

FIG. 8c is a diagrammatic illustration of a third embodiment of the connection plan according to FIG. 7; and FIG. 8d is a fourth embodiment of the connection plan according to FIG. 7.

DESCRIPTION OF THE PREFERRED EMBODIMENTS

Figure 1:
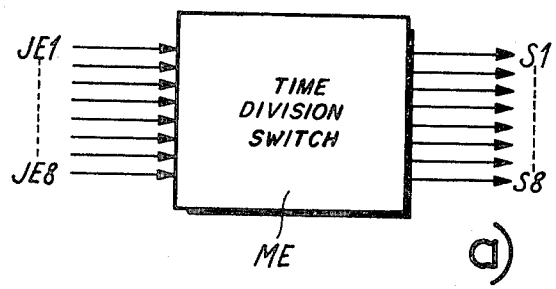
FIGS. 1(a) and 1(b) are a schematic showing of the connections of an MTS circuit in a time division stage for input and output respectively in a switching network of the TST type known per se.
Figure 1:
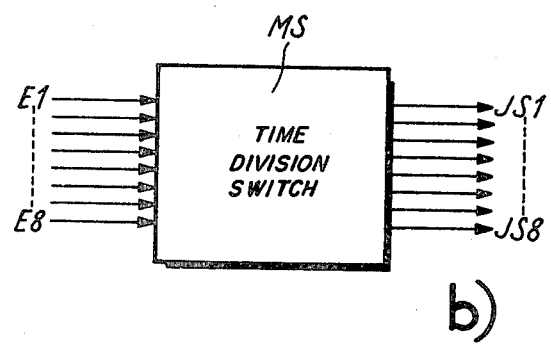

In FIG. 1(a), an MTS circuit is used in the input stage of a switching network of the type TST known per se as a time division switch ME. The speech samples are received on the eight PCM input junctions JE1-JE8. After having been commuted by the time division switch ME these speech samples are emitted on the eight output lines S1-S8 toward the central switching stage of the switching network.

In FIG. 1(b), an MTS circuit is used in the output stage of a switching network of the type TST known per se as a time division switch MS. The speech samples coming from the central switching stage of the switching network are received on eight input lines E1-E8. After having been commuted by the switch MS, these speech samples are emitted on eight output lines JS1-JS8. As a variation of the foregoing constructions, it is known to connect only seven input junctions to the switch ME and seven output junctions to the switch MS, the eighth input of ME and the eighth output of MS being used for making tests.

Figure 2:
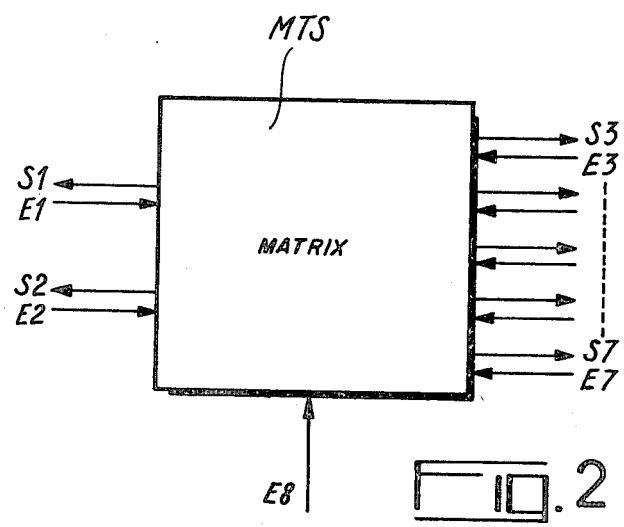
FIG. 2 is a schematic showing of the connections of an MTS circuit included in a terminal stage of a switching network according to the invention.

In FIG. 2, an MTS matrix is part of a stage which will be called the terminal stage of a switching network according to the invention. Each of its two inputs E1 and E2 is connected to a PCM input junction, each of its two outputs S1 and S2 is connected to a PCM output junction, while five of its inputs E3-E7 and five of its outputs S3-S7 can be connected to other parts of a switching network.

An MTS circuit included in the terminal stage of a switching network according to the invention can thus be coupled to the subscribers, junctors and auxiliaries through two bi-directional junctions through the intermediate action of members such as, for example, concentrators-deconcentrators, which will be discussed below, and by five bi-directional links to the rest of the switching network. The MTS circuit makes it possible to perform a time division switching, in both directions of transmission, in which the time slots come from or go to the subscribers, junctors and the auxiliaries or go toward or come from other parts of the switching network.

The subscribers, junctors and auxiliaries are connected to the switching network in identical fashion and, in which follows, the single term "subscribers" will be used to apply also to the junctors and auxiliaries.

The eighth input E8 is connected to a tone generator and a speech generator sometimes called "talking films". In one embodiment of the invention, this generator is duplicated for reliability reasons. The input E8 thus makes it possible to introduce tones and the aforementioned talking films into the conversation circuit.

Figure 3:
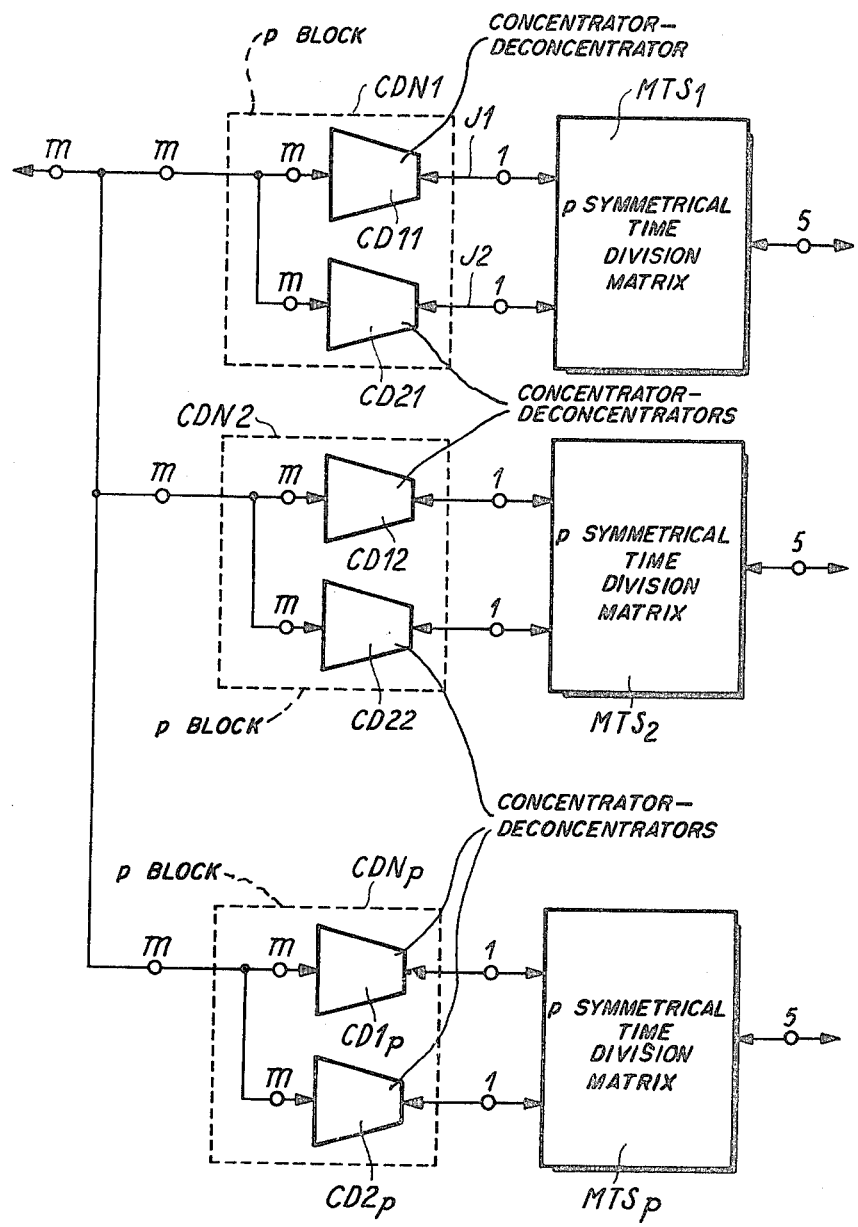
FIG. 3 is a schematic showing of a terminal unit for connecting subscribers, junctors and auxiliaries defining a portion of the terminal stage of a switching network according to the invention.

A terminal unit for connecting subscribers as illustrated in FIG. 3 thus includes p blocks CDN1–CDNp and p symmetrical time division matrices MTS1–MTSp. A terminal unit for connecting subscribers is connected to the subscribers by bi-directional PCM junctions and by intermediate peripheral members such as sampling systems, coding-decoding systems, and concentrators-deconcentrators, all of which are not described because they are not an integral part of the invention.

According to conventional usage, all connections are shown in FIG. 3 by a single line which contacts a circle near which a number indicates the real number of connections. The m PCM junctions of communication with the subscribers are multiplied on p blocks CDN1–CDNp. Each block such as CDN1 performs the digital concentration and deconcentration of m PCM junctions of connection with the subscribers onto two bi-directional junctions such as J1 and J2. Each block, such as CDN1, is connected in cascade to a symmetrical time-division matrix such as MTS1 through the intermediate action of two bi-directional junctions such as J1 and J2. Each MTS circuit has five inputs and five outputs, making it possible to connect to other parts of the switching network through one to five bi-directional PCM junctions.

Each block, such as CDN1, comprises two digital concentrators-deconcentrators such as CD11 and CD21, and the PCM junctions which connect to the subscribers and are attached to the block CDN1 are multiplied on the two digital concentrators-deconcentrators CD11 and CD21. Each of the concentrators-deconcentrators CD11 and CD21 makes it possible to concentrate or deconcentrate m bi-directional PCM junctions onto one bi-directional PCM junction, J1 and J2 respectively, through which it is coupled to the circuit MTS1.

The concentrator-deconcentrators such as CD11 are not further described because they may be of any known type and the exact manner of their construction is not an integral part of the present invention. The number p of MTS circuits is equal to the number p of blocks CDN. The number p of blocks CDN which is included in the same terminal unit for connecting subscribers depends on the traffic to be accomodated on the m bi-directional PCM junctions. For reliability reasons, p will always be less than or equal to the number 2. However, in the following description, the number p will be assumed to be equal to 2, by way of example.

Figure 4:
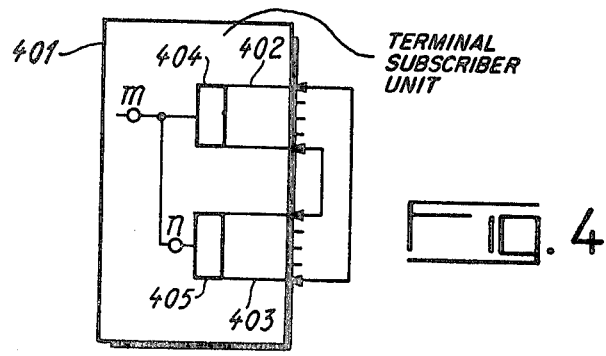
FIG. 4 is a schematic showing of one embodiment of a switching network according to the invention.

FIG. 4 illustrates one embodiment of a network according to the invention, in the case of an exchange of sufficiently low capacity, so that all of the subscribers can be connected to the same terminal subscriber unit 401. The unit 401 includes two symmetrical time division matrices 402 and 403 and blocks 404 and 405 which are analogous to the blocks CDN of FIG. 3 and are associated, respectively, with the circuits 402 and 403.

Inasmuch as the switching network is constituted by the two circuits 402 and 403, all communications between the subscribers may be established by directly connecting one input and one output of the circuit 402 to at least one output and one input of circuit 403.

A study of the traffic routings in such a configuration shows that by joining the circuits 402 and 403 with a single bi-directional junction, the blocking rate is on the order of $10^{-3}$, i.e., a rate which is much too high. By contrast, it is only necessary to connect the two circuits with two bi-directional junctions such as shown in FIG. 4 to obtain a zero blocking rate.

Figure 5:
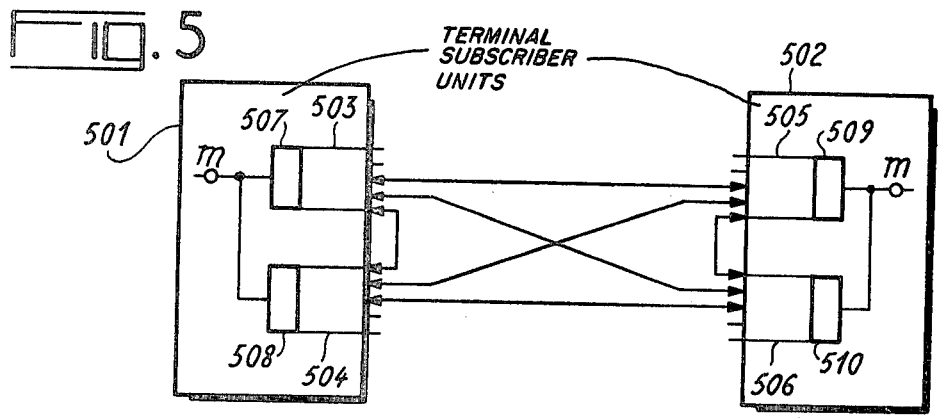
FIG. 5 is a schematic showing of a second embodiment of a switching network according to the invention.

FIG. 5 shows a particular embodiment of a switching network according to the invention, in the case of an exchange of a capacity such that the totality of subscribers is connected to two subscriber terminal units 501 and 502. Each unit 501 and 502 includes two symmetrical time division matrices, 503 and 504, as well as 505 and 506, respectively, and also the blocks 507, 508, 509 and 510 which are analogous to the blocks CDN of FIG. 3, and are associated with the circuits 503, 504, 505 and 506, respectively.

Each of the circuits 503–506 may be connected to five bi-directional junctions making it possible to connect the circuit to other parts of the switching network. The overall network is constituted by four circuits 504–506, and all of the communications between subscribers may be established by directly connecting at least one input and one output of each of the four circuits 503–506 to at least one output and one input of each of the three other circuits. A study of the traffic routings in such a configuration shows that one obtains an acceptable blocking rate, lower than $10^{-10}$, by simply connecting the four circuits, two by two, through a single bi-directional junction such as shown by FIG. 5.

Figure 6A:
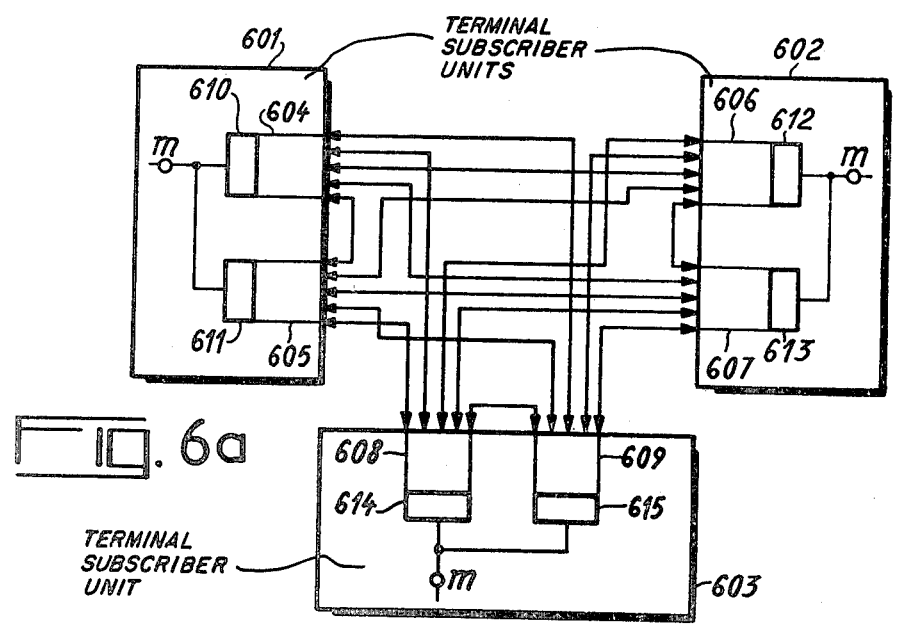
FIG. 6a is a schematic showing of a third embodiment of a switching network according to the invention.

FIG. 6a shows another embodiment of the invention in the case of an exchange of such capacity that the total number of subscribers is connected to three subscriber terminals 601, 602 and 603. Each of these units includes two symmetrical time division 604 and 605, 606 and 607, 608 and 609, respectively, as well as the blocks 610–615, analogous to the blocks CDN of FIG. 3 and associated with circuits 604–609, respectively.

Each of the circuits 604–609 may be connected to five bi-directional junctions so that these circuits can be connected to other parts of the switching network. The overall switching network consists of the six circuits 604–609 and all communications between the subscribers may be established by directly connecting one input and one output of each of the six circuits 604–609 to one output and one input of each of the five other circuits.

A study of the traffic routings in such a configuration shows that, by thus connecting six circuits, two by two, through a bi-directional junction, one obtains an acceptable blocking rate which is lowered to $10^{-15}$.

Figure 6B:
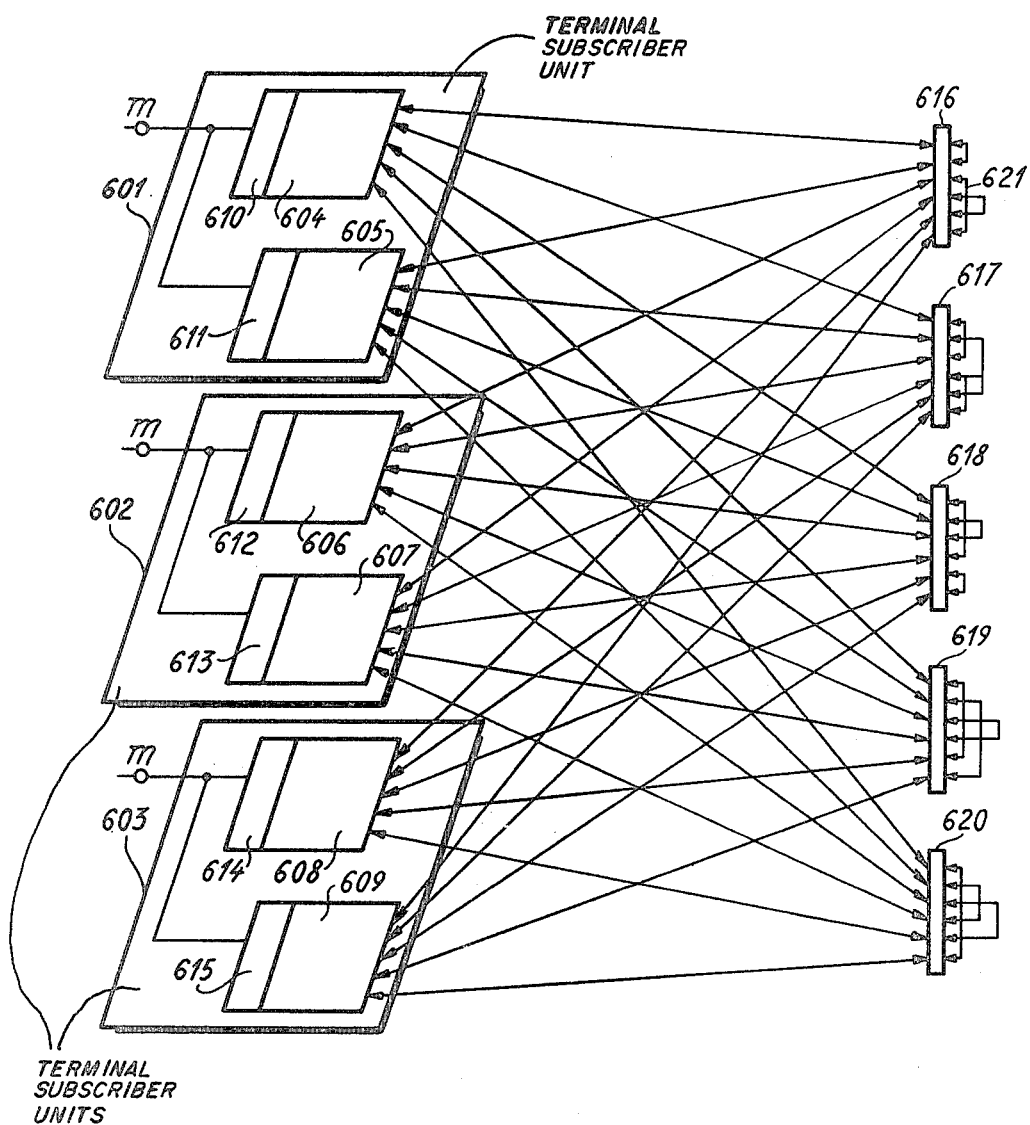
FIG. 6b is a schematic showing of a fourth embodiment of a switching network according to the invention.

FIG. 6b shows another embodiment of a switching network such as in FIG. 6 and is equivalent thereto in its structure and in its functional possibilities. The difference with respect to the embodiment of FIG. 6a is only that each output and each input of one of the circuits 604-609 is no longer directly connected to one input and one output of each of the other circuits, but is connected through the intermediate action of the connectors 616-620.

Each of the MTS circuits 604-609 has access to each of the connectors 616-620 through a bi-directional junction. The points of connection of these connectors are short circuited, two by two, by junctions such as, for example, the junction 621, so disposed as to permit the establishment of a bi-directional route between all of the circuits 604-609, taken two at a time. The significance of the embodiment according to FIG. 6b will become more apparent when considered with the description of the embodiment of FIG. 7.

Figure 7:
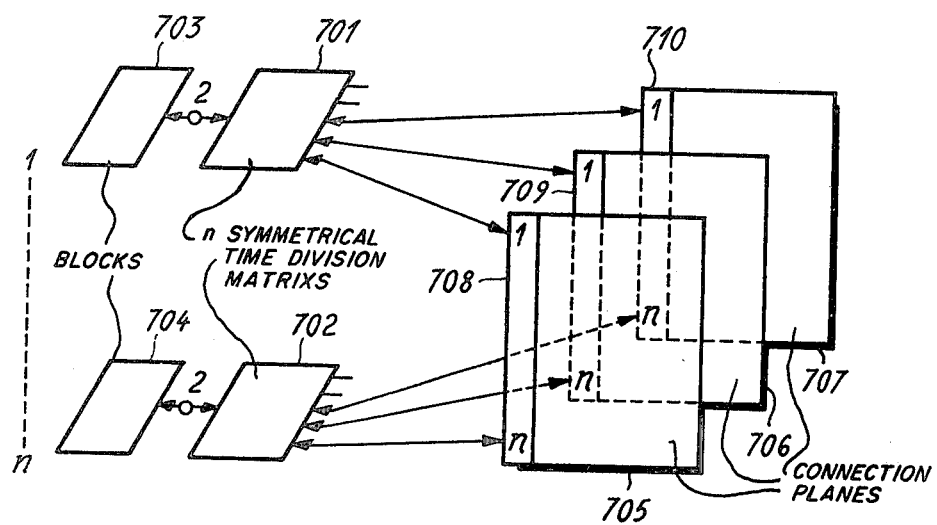
FIG. 7 is a schematic showing of a fifth embodiment of a switching network according to the invention.

FIG. 7 shows an embodiment of a network according to the invention in the case of an exchange of a capacity such that three terminal subscriber units no longer suffice for connecting the assembly of subscribers. In that case, the terminal switching network comprises more than six symmetrical time division matrices. Thus, each MTS circuit can no longer be connected to the other parts of the network by only five bi-directional junctions. It is thus impossible to connect more than six MTS circuits directly together, two by two. In FIG. 7, n symmetrical time division matrices such as 701 and 702 with their associated blocks 703 and 704, analogous to the blocks CDN of FIG. 3, are necessary for connecting the entire group of subscribers. The MTS circuits are no longer connected directly by bi-directional junctions but through the intermediary action of connection planes 705, 706 and 707, which will be described in greater detail with reference to the FIGS. 8a through 8d.

A study of the traffic shows that only two connection planes are necessary to handle the traffic. For reasons of increased reliability, the number of connection planes in the illustrated example has been fixed at three. The blocking rate is thus of the order of $10^{-25}$ and it will be of the order of $10^{-6}$ if one of the three connection planes is defective and the entire traffic must be handled by only two planes.

Each MTS circuit such as 701, 702 has access through a bi-directional junction to each one of the three connection planes 705, 706 and 707 through the intermediate connectors 708, 709 and 710. Each MTS circuit is thus connected to three bi-directional junctions and each connection plane is connected to n bi-directional junctions.

A comparison of the embodiments of FIGS. 4-7 shows that when the number of subscribers which must be connected to the telephone exchange increases, it is easy to make extensions in the equipment without extensively altering the structure of the switching network.

In effect, in order to accommodate additional subscribers, if the number of additional subscribers makes it necessary to go beyond the structure of the switching network shown in FIG. 4 to the structure shown in FIG. 5, or from the structure shown in FIG. 5 to the structure shown in FIGS. 6a, it is only necessary to add the necessary number of terminal subscriber units and to connect the new MTS circuits to the previously existing ones through new bi-directional junctions. If the number of subscribers makes it necessary to go beyond even the structure of the switching network of FIG. 6b to that of the structure of FIG. 7, this extension of equipment may also be made very simply.

In a preferred example of the invention, short-circuits such as 621 in the embodiment of FIG. 6b are effected by a wiring on a plug-in printed circuit board. To change over from one structure to the other, it is necessary only to unplug the five circuit boards bearing the short-circuit from the connectors and to plug in the three printed circuits on which the connection planes are mounted. Of course, the number of terminal subscriber units must also be increased and the bi-directional junctions must be installed to connect up the new MTS circuits and the three connectors.

It would also be possible to provide the network of FIGS. 4 and 5 in analogous fashion to that shown in FIG. 6b where the extensions that would be made are those described above by making changes in the printed circuit boards.

FIGS. 8a through 8d show different embodiments of each of the connection planes 705, 706 and 707. Each of these connection planes is composed of an assembly of symmetrical time division matrices.

FIG. 8d shows an embodiment in the case of a telephone exchange of a capacity such that four terminal subscriber units, each having a total of eight MTS circuits, are necessary to connect the group of all the subscribers. Each of the three connection planes 705, 706 and 707 is connected to the aforementioned MTS circuits by eight bi-directional junctions and has thus eight inputs and eight outputs. Inasmuch as an MTS circuit is a space and time division switch with eight inputs and eight outputs, it is thus only necessary to have a single MTS circuit 801 to provide this arrangement as shown in FIG. 8a.

FIG. 8b illustrates the embodiment in the case of a telephone exchange of such capacity that sixteen MTS circuits are required to connect up the assembly of all the subscribers in the subscriber terminal units. Each of the three connection planes 705, 706 and 707 is connected to these MTS circuits by sixteen bi-directional junctions and thus has sixteen inputs and sixteen outputs. This arrangement thus includes an input stage composed of two MTS circuits 802 and 803, an output stage composed of the two MTS circuits 804 and 805, and an intermediate stage composed of two MTS circuits 806 and 807.

The two MTS circuits of the input stage and the two MTS circuits of the output stage make it possible, respectively, to provide the sixteen inputs and sixteen outputs of this connection plan.

The two MTS circuits 806 and 807 make it possible to switch each time interval appearing on one of the inputs 802 or 803 to any of the outputs 804 or 805, practically without blocking.

To this purpose, the eight outputs of each of the MTS circuits 802 and 803 are divided in half on the inputs of each of the MTS circuits 806 and 807, and the eight outputs of each of the MTS circuits 806 and 807 are divided in half on the inputs of each of the MTS circuits 804 and 805.

FIG. 8c illustrates a connection plan for the case of a telephone exchange of a capacity such that thirty-two MTS circuits are required to connect up the group of all the subscribers in the subscriber terminal units. Each of the three connection planes 705, 706 and 707 is connected to its MTS circuit by thirty-two bi-directional junctions and thus has thirty-two inputs and thirty-two outputs. This plan thus has an input stage composed of four MTS circuits 808-811, an output stage composed of four MTS circuits 812-815 and an intermediate stage composed of four MTS circuits 816-819.

The four MTS input circuits and the four MTS output circuits make it possible, respectively, to obtain the thirty-two inputs and thirty-two outputs of the connection plan. The intermediate four MTS circuits make possible a switching of all time slots appearing on one input junction of this stage to any of the output junctions, practically without blocking. For this purpose, the eight outputs of each of the MTS circuits of the input stage are divided evenly on the inputs of the intermediate MTS circuits, two output junctions of each of the MTS circuits 808–811 being connected to two input junctions of one of the MTS circuits 816–819. In the same manner, the eight outputs of each of the MTS circuits of the intermediate stage are evenly divided on the inputs of the MTS circuits of the output stage, two outputs of each of the MTS circuits 816–819 being connected to two input junctions of one of the MTS circuits 812–815.

FIG. 8d shows a connection plan in the case of a telephone exchange of a capacity such that sixty-four MTS circuits are required to connect the assembly of subscribers in the subscriber terminal units. Each of the three connection planes 705, 706 and 707 is connected to these MTS circuits by sixty-four bi-directional junctions and thus has sixty-four inputs and sixty-four outputs. This plan thus includes an input stage composed of eight MTS circuits 820–827, an output stage composed of eight MTS circuits 828–835, and an intermediate stage composed of eight MTS circuits 836–843.

The eight input circuits and eight output circuits make possible the realization of sixty-four inputs and sixty-four outputs. The eight intermediate MTS circuits make possible a switching of all time slots appearing on one input junction of the input stage to any output junction of the output stage, practically without blockage.

For this purpose, the eight outputs of each of the MTS circuits of the input stage are divided evenly on the inputs of the intermediate MTS circuits, the output junction $n^o i$ of the MTS circuit $n^o j$ of the input stage being connected to the input junction $n^o j$ of the MTS circuit $n^o i$ of the intermediate stage, where the numbers i and j successively assume all the values between 0 and 7. In the same way, the eight outputs of each of the MTS circuits of the intermediate stage are evenly divided over the inputs of the MTS circuits of the output stage, where the output junction $n^o r$ of the MTS circuit $n^o q$ of the intermediate stage is connected to the input junction $n^o q$ of the MTS circuit $n^o r$ of the output stage, the numbers r and q successively assuming all the values between 0 and 7.

In the case of an exchange of a capacity such that the number of MTS circuits included in the terminal subscriber units is different from eight, sixteen, thirty-two or sixty-four, the configuration of the plan which is used then corresponds to that of the number which is just greater than the number of MTS circuits, and the inputs and outputs of this plan are thus not all used. After each connection is established, a test of the switching network takes place. The test is performed in the manner described above with respect to the embodiment of FIG. 3. Each concentrator-deconcentrator, such as, for example, CD11, has a concentrator one of whose inputs is reserved for the test and a deconcentrator which has an output that is also reserved for testing. After establishing a connection, a test sequence is sent on the test input of the concentrator. This sequence traverses the connection grid through the same elements that are used by the connection that is to be tested. One then verifies that the test sequence is properly received on the reserved output of the deconcentrator which is used for establishing the connection.

Each element a of the switching network is associated with a counter. If a malfunction occurs in one of the elements, the associated counter is incremented. Once the number within any of the counters which corresponds to the number of detected faults attains a certain threshold, a program which analyzes the contents of these counters is started so as to localize the defective element.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A time division switching network for switching binary samples of (a) binary elements from input junctions to output junctions, including a plurality of terminal stage modules, a modular terminal stage and a central stage that permits the interconnection of different terminal stage modules, (m) input junctions and (m) output junctions each of said terminal stage modules including (p) block (p being superior or equal to two) arranged in groups, each group comprising one block of two digital concentrators-deconcentrators and one symmetrical time division matrix having (a) inputs and (a) outputs, the (m) input junctions of said module being multipled on the inputs of all the digital concentrators-deconcentrators, and the (m) output junctions of said module being multipled on the outputs of all said digital concentrator-deconcentrators, each of said two digital concentrator-deconcentrators of the group having one input and one output connected, respectively, to one output and one input of the symmetrical time division matrix, a generator of audible tones and messages, said symmetrical time division matrix having one input connected to said generator of audible tones and messages and (a-3) remaining inputs and (a-3) outputs connected to said central stage.

2. A time division switching network according to claim 1 wherein said terminal stage includes at most (a-2) symmetrical time division matrices having (a) inputs and (a) outputs and further wherein said central stage is composed of junctions intended to connect all of said matrices between them, two by two, each connection being composed of at least two junctions having different directions of transmission.

3. A time division switching network according to claim 1 including a connector having a plurality of connection points and wherein said terminal stage comprises at most (a-2) symmetrical time division matrices having (a) inputs and (a) outputs, and further wherein said central stage is composed of junctions intended to connect at least one input and one output of each matrix to said connector, said connection points of said connector being short-circuited two by two in such a way that all of the matrices are connected to each other two by two by connections each of which has at least, and for each direction of transmission, a first junction, a first connection point of a connector, a short-circuit, a second connection point of said connector, and a second junction.

4. A time division switching network according to claim 1 wherein said terminal stage comprises at least (a-1) symmetrical time division matrices having (a) inputs and (a) outputs, and wherein said central stage is composed of 1 to (a-3) connection planes each having at least one symmetrical time division matrix identical to those in said terminal stage, and each connection plane including (n) inputs and (n) outputs, an intermediate connector for connecting each module to each matrix in said terminal stage by at least two junctions having different directions of transmission.

5. A time division switching network according to claim 4, wherein the number (a) equals 8.

6. A time division switching network according to claim 4 wherein (n) is greater than 8 and no greater than 16 and wherein each module comprises three stages in cascade and wherein each stage comprises two symmetrical time division matrices with eight inputs and eight outputs, the inputs of the matrices of the first stage and the outputs of the matrices of the third stage constituting, respectively, the inputs and outputs of said connection plane, each matrix of the first stage having four outputs connected to four inputs of one of the matrices of the second stage and four outputs connected to four inputs of the other matrix of the second stage, each matrix of the second stage having four outputs connected to four inputs of one of the matrices of the third stage and four outputs connected to four inputs of the other matrix of the third stage.

7. A time division switching network according to claim 4 wherein (n) is greater than 16 and no greater than 32 and further wherein each connection plane is composed of three stages connected in cascade, each stage comprising four symmetrical time division matrices with eight inputs and eight outputs, the inputs of the matrices of the first stage and the outputs of the matrices of the third stage being, respectively, the inputs and outputs of the connection plane, each matrix of the first stage having its outputs grouped two by two, each group of two outputs being connected to two inputs of the other matrix of the second stage, and each matrix of the second stage having its outputs grouped two by two, each group of two outputs being connected to two inputs of a different matrix in the third stage.

8. A time division switching network according to claim 5 wherein (n) is greater than 16 and no greater than 64 and wherein each connection plane is composed of three stages connected in cascade, each stage having eight symmetrical time division matrices with eight inputs and eight outputs, the inputs of the matrices of the first stage and the outputs of the matrices of the third stage being, respectively, the inputs and outputs of the connection plane, each matrix of the first stage having each of its outputs connected to one input of a different matrix of the second stage, and each matrix of the second stage having each of its outputs connected to an input of a different matrix in the third stage.

9. A time division switching network according to claim 4 wherein said central stage is composed of three modules.

10. A time division switching network according to claim 4, wherein one input and one output of each digital concentrator-deconcentrator of the terminal stage is reserved for testing, such that a testing path is established across the switching network by emitting a signal train on the reserved testing input of the concentrator-deconcentrator associated with the input of this path, the signal train being able to follow this path and being received on the reserved output of the concentrator-deconcentrator associated with the output of this path whereby the test permits a determination of at least one defective element being present in the signal path if the transmitted test signals and the received test signals are different.

* * * * *